United States Patent
Zhang et al.

(10) Patent No.: US 8,948,105 B2
(45) Date of Patent: Feb. 3, 2015

(54) METHOD AND SYSTEM FOR DYNAMIC ADJUSTMENT OF DOWNLINK/UPLINK ALLOCATION RATIO IN LTE/TDD SYSTEM

(75) Inventors: Wenfeng Zhang, Plano, TX (US); Yuhong Duan, Shanghai (CN); Jian Hu, Shanghai (CN); Zhifeng Ma, Shanghai (CN); Zhongda Du, Shanghai (CN); Bin Yu, Shanghai (CN)

(73) Assignee: ZTE (USA) Inc., Iselin, NJ (US)

( * ) Notice: Subject to any disclaimer, the term of this patent is extended or adjusted under 35 U.S.C. 154(b) by 550 days.

(21) Appl. No.: 13/318,120

(22) PCT Filed: Apr. 27, 2010

(86) PCT No.: PCT/US2010/032602
§ 371 (c)(1),
(2), (4) Date: Jan. 12, 2012

(87) PCT Pub. No.: WO2010/129295
PCT Pub. Date: Nov. 11, 2010

(65) Prior Publication Data
US 2012/0120854 A1     May 17, 2012

Related U.S. Application Data

(60) Provisional application No. 61/173,535, filed on Apr. 28, 2009.

(51) Int. Cl.
*H04W 72/04* (2009.01)
*H04B 7/26* (2006.01)
*H04W 72/12* (2009.01)

(52) U.S. Cl.
CPC ......... *H04B 7/2656* (2013.01); *H04W 72/0493* (2013.01); *H04W 72/12* (2013.01)
USPC ............................ 370/329; 370/341; 370/437

(58) Field of Classification Search
None
See application file for complete search history.

(56) References Cited

U.S. PATENT DOCUMENTS

| 8,538,445 | B2 * | 9/2013 | Suo et al. | 455/450 |
| 2009/0249153 | A1 * | 10/2009 | Zhang | 714/748 |

(Continued)

FOREIGN PATENT DOCUMENTS

| CN | 101414902 A | 4/2009 |
| CN | 101926214 A | 12/2010 |

(Continued)

OTHER PUBLICATIONS

ZTE Corporation, "Support to Live-Change of Downlink-Uplink Allocation Ration in LTE/TDD," 3$^{rd}$ Generation Partnership Project (3GPP), TSG RAN WG1 Meeting # 52bis, Mar. 31-Apr. 4, 2008, Shenzhen, China, 13 pages.

(Continued)

*Primary Examiner* — Duc Duong
(74) *Attorney, Agent, or Firm* — Duane Morris LLP

(57) ABSTRACT

A method and system for dynamic adjustment of downlink/uplink resource allocation ratio in a long-term evolution (LTE) time division duplex (TDD) system is disclosed. The method includes replacing at least one uplink subframe in a subframe pattern with at least one of a mute subframe and a mute uplink pilot timeslot (UpPTS), within a geographical guard area that isolates at least two areas having different TDD allocation patterns. The method further includes scheduling an uplink transmission from at least one mobile terminal such that the at least one of the mute subframe and the mute UpPTS are unused. A simple solution or a TDD configuration index substitution solution, or any combination thereof, may be used to control the uplink transmission involving a mute subframe or a mute UpPTS.

34 Claims, 4 Drawing Sheets

(56) References Cited

U.S. PATENT DOCUMENTS

| | | | |
|---|---|---|---|
| 2010/0172311 A1* | 7/2010 | Agrawal et al. | 370/329 |
| 2011/0228709 A1* | 9/2011 | Kim et al. | 370/279 |
| 2011/0243107 A1* | 10/2011 | Koivisto et al. | 370/336 |
| 2011/0310778 A1* | 12/2011 | Seo et al. | 370/280 |
| 2012/0263135 A1* | 10/2012 | Ahmadi | 370/329 |
| 2013/0176919 A1* | 7/2013 | Pan et al. | 370/280 |

FOREIGN PATENT DOCUMENTS

| | | | |
|---|---|---|---|
| EP | 1511190 A1 | 3/2005 | |
| EP | 2139122 A1 | 12/2009 | |
| JP | 2006-523075 A | 10/2006 | |
| WO | WO-2004/093343 A1 | 10/2004 | |
| WO | WO-2007/139320 A2 | 12/2007 | |
| WO | WO-2008/114694 A1 | 9/2008 | |

OTHER PUBLICATIONS

European Search Report mailed Aug. 12, 2013, in corresponding European Patent Application No. 10772536.8, 7 pages.

Office Action dated Dec. 4, 2013, in corresponding Chinese Application No. 201080018435.9, 10 pages.

Office Action dated Feb. 17, 2014, in corresponding Japanese Patent Application No. 2012-508600, 8 total pages.

* cited by examiner

METHOD AND SYSTEM FOR DYNAMIC ADJUSTMENT OF DOWNLINK/UPLINK ALLOCATION RATIO IN LTE/TDD SYSTEM

CROSS-REFERENCE TO RELATED APPLICATIONS

This application is a U.S. National Phase Application of International Application No. PCT/US2010/032602 filed Apr. 27, 2010, which claims priority to U.S. Provisional Patent Application No. 61/173,535 filed on Apr. 28, 2009, entitled "Method for Live-Change of Downlink/Uplink Allocation Ratio Adjustment in LTE/TDD System", the contents of which are incorporated by reference herein in their entirety.

FIELD OF THE INVENTION

The present invention relates generally to dynamic resource allocation, and more particularly to methods and systems for dynamic adjustment of downlink-uplink allocation ratios in Long-term Evolution (LTE) time division duplex (TDD) systems.

BACKGROUND

TDD systems include the flexibility of bandwidth allocation in an unpaired frequency band, and the flexibility of choice on a downlink to uplink resource allocation ratio (referred to as "D/U ratio" herein). The latter is attractive because of the emerging traffic service types and traffic volume turbulence, both of which result in a wide range of D/U ratios. On the other hand, the requirement for system-wide synchronization is traditionally a major disadvantage of TDD systems. Under this requirement, all base stations or all user equipment must follow the same system timing to turn off a transmitter, in order to avoid overlapping between downlink and uplink signals in the overall system.

The timing requirement may weaken TDD features regarding D/U ratio flexibility. First, because all base stations and user equipments are synchronized, there can be only one D/U ratio per carrier frequency, on a system-wide basis. Second, once the D/U ratio is determined for a system, it may be too expensive to change it to other values because, before synchronously changing the D/U ratio, all transmitters have to shut off the transmission all together. The costs paid for such a "cold restart" include a huge loss of system capacity and interruption of user traffic. In addition, the monitoring and management of unfinished traffic in the entire system is expensive and time-consuming.

One previous invention provides a systematic method to accomplish two targets:

i. Live-change (without cold restart) of the D/U ratio system-widely from one value to another; and ii. Live-change (without cold restart) of the D/U ratio within a specific deployment area to a different value from one in surrounding areas.

In some LTE TDD systems, exemplary downlink-uplink allocations are specified in Table 1.

TABLE 1

Downlink-Uplink Allocations in LTE-TDD

| Con-figuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The subframes in LTE-TDD can be downlink subframes (D), uplink subframes (U) and special subframes (S) that includes three fields Downlink Pilot Timeslot (DwPTS), Guard Period (GP) and Uplink Pilot Timeslot (UpPTS).

It is suggested by a previous invention to specify a fourth subframe type: a mute subframe M. The mute subframe M is a special subframe that has neither a downlink signal nor an uplink signal during its full subframe duration. If the system plans to convert a certain downlink subframe to uplink or vice versa, it has to mark the subframe as a mute subframe M first. Once the downlink or uplink subframe is marked as a mute subframe M, it shall not be used for any transmission until it is marked as either a downlink subframe or an uplink subframe again. The system can assign the mute subframe that is originally a downlink (or uplink) subframe to be used as an uplink (or downlink) subframe. With the creation of a mute subframe M, the network could change the D/U ratio either system-wide or only for certain deployment areas.

The frame allocation configuration under i-th D/U ratio is denoted in Table 1 as $C_i = c_{i,0} c_{i,1} \ldots c_{i,9}$, where $i$ ($0 \leq i \leq 6$) is the TDD allocation index broadcast in SIB, $c_{i,k}$ represents the allocation attribute (downlink, uplink or special subframe) of k-th subframe ($0 \leq k < 10$). Therefore, $c_{i,k} \in \{D,U,S\}$, where D, U and S respectively stand for downlink subframe, uplink subframe and special subframe, as shown in Table 1. In order to exchange two TDD allocation configurations $C_i$ and $C_j$ without TDD inband interference between downlink and uplink, one previous invention proposed to create a special TDD allocation pattern $A_l = a_0 a_1 \ldots a_9$ such that, for any $0 \leq k < 10$, $a_k = c_{i,k} = c_{j,k}$ if $C_{i,k} = c_{j,k}$;

$a_k = M$ if $c_{i,k} \neq c_{j,k}$, where letter M stands for a muted subframe; and $$l = \begin{cases} i & \text{if } A_l(M = U) = C_i \\ j & \text{if } A_l(M = U) = C_j, \end{cases}$$

where $A_l(M=U)$ represents the allocation obtained by converting all muted durations in allocation $A_l$ to uplink channel; similarly, $A_l(M=D)$ represents the allocation obtained by converting all muted durations in allocation $A_l$ to downlink channel.

These special allocation patterns with mute intervals are applied to a geographical guard band that isolates areas with different D/U ratios. In the following description, both notations $C_i$ and Ci are used and refer to the same allocation pattern; so do $A_i$ and Ai.

Two TDD allocation ratio changes in an LTE system have been proposed, and are shown in FIG. 3 and FIG. 4, respectively. FIG. 3 allows any TDD allocation ratio changing to any one else possibly by first changing to one or even more other intermediate allocation ratios, while FIG. 4 only allows the allocation ratio changing to another with the same switching point periodicity. So FIG. 3 provides larger range for TDD allocation ratio to change. However, the LTE standard body confirms that any downlink portion of subframe including the DwPTS cannot be muted. Therefore a new allocation pattern should be defined to replace A2 in FIG. 3.

The D/U allocation change has a timing impact to some physical layer functions, such as random access preamble transmission, cell-specific sounding reference signal (SRS) transmission and downlink/uplink Hybrid Automatic Repeat-request (HARQ) process.

Random access preambles are transmitted on uplink by mobile terminal to initiate contention-based resource request. The preambles have various format lengths in time and can fit into N ($N \in \{1, 2, 3\}$) successive uplink subframes.

Cell-specific SRS is also transmitted by mobile terminal within a cell-specific uplink resource to provide a reference signal for base station to measure the channel quality. Each SRS transmission takes place in only one subframe and does not cross multiple subframes.

HARQ is the process by which the traffic transmission is acknowledged by the receiver end that sends ACK/NAK signaling on the opposite communication link and traffic retransmission maybe triggered upon negative acknowledgement (NAK). The delay between traffic (re-)transmission and acknowledge feedback (ACK/NAK) is predetermined in a standard specification. Although downlink and uplink HARQ processes implementing mute subframes have been previously described, it is found that some alternative solutions could be simpler and easier for standard specifications and product implementations (see, for example, U.S. patent application Ser. No. 12/410,350, entitled "Dynamic Adjustment and Signaling of Downlink/Uplink Allocation Ratio in LTE/TDD systems," filed Mar. 24, 2009, which is incorporated herein by reference in its entirety). In addition, downlink and uplink HARQ processes with mute subframe(s) are never specified for allocation A2, and random access preamble transmission and cell-specific SRS transmission are both missing from the prior art.

According to LTE specifications, user equipment (UE) shall transmit ACK/NAK in uplink subframe $n_U$ for traffic transmissions on physical downlink shared channel (PDSCH) in subframe $n_U$-k, where k∈K and K (defined in Table 2) is called a downlink association index set of M elements {$k_0$, $k_1$, L $k_{M-1}$} depending on the subframe $n_U$ and the UL-DL configuration. TDD ACK/NAK bundling and multiplexing is performed by a logical AND operation of all individual ACK/NAKs corresponding to HARQ packets across multiple downlink subframes (ACK/NAK bundling) or HARQ packets across single downlink subframe.

According to LTE specifications, the UE shall transmit a new data packet or re-transmit an old data packet on a physical uplink shared channel (PUSCH) in subframe $n_D$+$k_{PUSCH}$ upon a scheduling command or negative ACK/NAK in downlink subframe $n_D$; the UE shall expect ACK/NAK on a physical HARQ indication channel (PHICH) in downlink subframe $n_U$+$k_{PHICH}$ for its traffic (re)transmission on PUSCH in subframe $n_U$. $k_{PUSCH}$ and $k_{PHICH}$ are defined in Table 3. (See also U.S. patent application Ser. No. 12/410,350).

TABLE 2

| | DL HARQ timing in LTE | | | | | | | | | |
|---|---|---|---|---|---|---|---|---|---|---|
| UL-DL | ACK/NAK Subframe $n_U$: PDSCH in subframe $n_U$ − k | | | | | | | | | |
| allocations | 0 | 1 | 2 | 3 | 4 | 5 | 6 | 7 | 8 | 9 |
| C0 | — | — | 6 | — | 4 | — | — | 6 | — | 4 |
| C1 | — | — | 7, 6 | 4 | — | — | — | 7, 6 | 4 | — |
| C2 | — | — | 8, 7, 4, 6 | — | — | — | — | 8, 7, 4, 6 | — | — |
| C3 | — | — | 7, 6, 11 | 6, 5 | 5, 4 | — | — | — | — | — |
| C4 | — | — | 12, 8, 7, 11 | 6, 5, 4, 7 | — | — | — | — | — | — |
| C5 | — | — | TBD | — | — | — | — | — | — | — |
| C6 | — | — | 7 | 7 | 5 | — | — | 7 | 7 | — |

TABLE 3

| | UL HARQ timing in LTE | | | | | | | | | | | | | | | | | | | |
|---|---|---|---|---|---|---|---|---|---|---|---|---|---|---|---|---|---|---|---|---|
| TDD UL/DL | $k_{PUSCH}$ for DL subframe number $n_D$: (PUSCH in subframe $n_D$ + $k_{PUSCH}$) | | | | | | | | | | $k_{PHICH}$ for UL subframe number $n_U$: (PHICH in subframe $n_U$ + $k_{PHICH}$) | | | | | | | | | |
| allocations | 0 | 1 | 2 | 3 | 4 | 5 | 6 | 7 | 8 | 9 | 0 | 1 | 2 | 3 | 4 | 5 | 6 | 7 | 8 | 9 |
| C0 | 4 | 6 | — | — | — | 4 | 6 | — | — | — | — | — | 4 | 7 | 6 | — | — | 4 | 7 | 6 |
| C1 | — | 6 | — | — | 4 | — | 6 | — | — | 4 | — | — | 4 | 6 | — | — | — | 4 | 6 | — |
| C2 | — | — | — | 4 | — | — | — | 4 | — | — | — | — | 6 | — | — | — | — | 6 | — | — |
| C3 | 4 | — | — | — | — | — | — | 4 | 4 | — | — | 6 | 6 | 6 | — | — | — | — | — |
| C4 | — | — | — | — | — | — | — | 4 | 4 | — | — | — | 6 | 6 | — | — | — | — | — | — |
| C5 | — | — | — | — | — | — | — | 4 | — | — | — | — | 6 | — | — | — | — | — | — | — |
| C6 | 7 | 7 | — | — | — | 7 | 7 | — | — | 5 | — | — | 4 | 6 | 6 | — | — | 4 | 7 | — |

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

One embodiment is directed to a method and system for dynamic adjustment of downlink/uplink resource allocation ratio in a long-term evolution (LTE) time division duplex (TDD) system is disclosed. The method includes replacing at least one uplink subframe in a subframe pattern with at least one of a mute subframe and a mute uplink pilot timeslot (UpPTS), within a geographical guard area that isolates at least two areas having different TDD allocation patterns. According to various embodiments, the method further includes scheduling an uplink transmission from at least one mobile terminal such that the at least one of the mute subframes and/or the mute UpPTS are unused.

According to certain embodiments, a simple solution or a TDD configuration index substitution solution, or any combination thereof, may be used to control the uplink transmission involving a mute subframe or a mute UpPTS.

Another embodiment is directed to a station configured for dynamic adjustment of downlink/uplink resource allocation ratio in an LTE TDD system. The station includes a processor configured to replace at least one uplink subframe in a subframe pattern with at least one of a mute subframe and a mute uplink pilot timeslot (UpPTS), within a geographical guard area that isolates at least two areas having different TDD allocation patterns. According to various embodiments, the station may further include a scheduler configured to schedule an uplink transmission from at least one mobile terminal such that the at least one of the mute subframes and/or the mute UpPTS are unused.

According to certain embodiments, a simple solution or a TDD configuration index substitution solution, or any combination thereof, may be used to control the uplink transmission involving a mute subframe or a mute UpPTS.

Yet another embodiment is directed to a computer-readable medium storing instructions thereon performing a method dynamic adjustment of downlink/uplink resource allocation ratio in a LTE TDD system. The method may include replacing at least one uplink subframe in a subframe pattern with at least one of a mute subframe and a mute UpPTS, within a geographical guard area that isolates at least two areas having different TDD allocation patterns. According to various embodiments, the method further includes scheduling an uplink transmission from at least one mobile terminal such that the at least one of the mute subframes and/or the mute UpPTS are unused.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
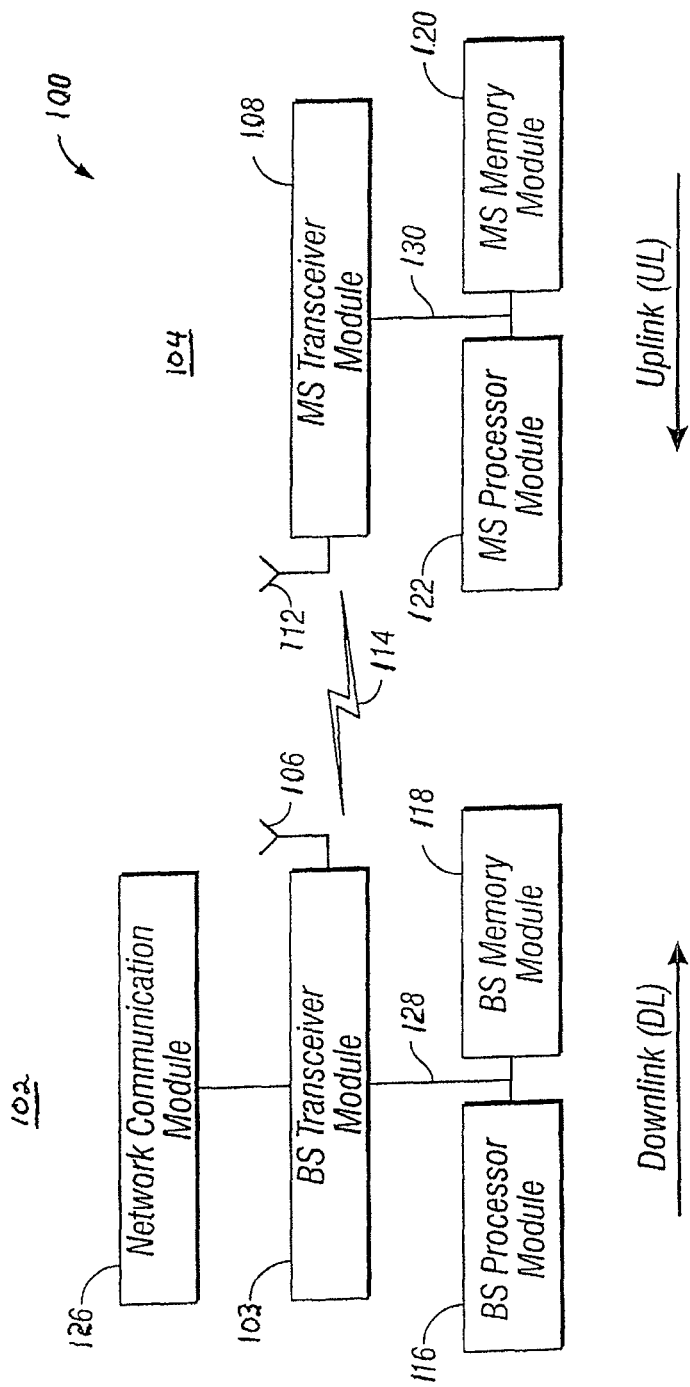
FIG. 1 shows an exemplary wireless communication system for transmitting and receiving transmissions, according to one embodiment.
Figure 2:
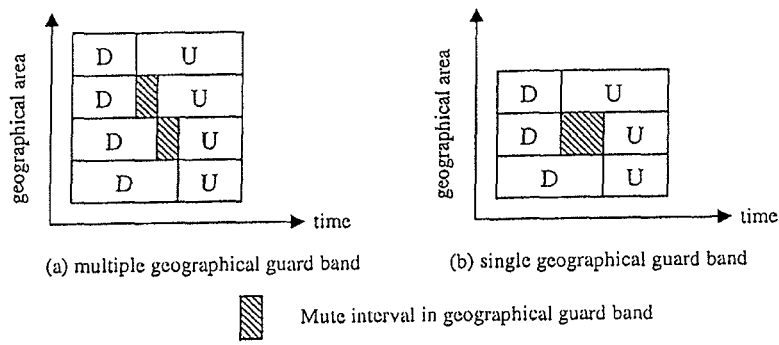
FIG. 2 shows an exemplary co-existence of different TDD allocation patterns with assistance of geographical guard band and mute subframes, according to one embodiment.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles described herein may be applied to other examples and applications without departing from the spirit and scope of the invention. Thus, the present invention is not intended to be limited to the examples described and shown herein, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

FIG. 1 shows an exemplary wireless communication system 100 for transmitting and receiving transmissions, in accordance with one embodiment of the present disclosure. The system 100 may include components and elements configured to support known or conventional operating features that need not be described in detail herein. System 100 generally comprises a base station 102 with a base station transceiver module 103, a base station antenna 106, a base station processor module 116 and a base station memory module 118. System 100 generally comprises a mobile station 104 with a mobile station transceiver module 108, a mobile station antenna 112, a mobile station memory module 120, a mobile station processor module 122, and a network communication module 126. Of course both base station 102 and mobile station 104 may include additional or alternative modules without departing from the scope of the present invention. Further, only one base station 102 and one mobile station 104 is shown in the exemplary system 100; however, any number of base stations 102 and mobile stations 104 could be included.

These and other elements of system 100 may be interconnected together using a data communication bus (e.g., 128, 130), or any suitable interconnection arrangement. Such interconnection facilitates communication between the various elements of wireless system 200. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

In the exemplary system 100, the base station transceiver 103 and the mobile station transceiver 108 each comprise a transmitter module and a receiver module (not shown). Additionally, although not shown in this figure, those skilled in the art will recognize that a transmitter may transmit to more than one receiver, and that multiple transmitters may transmit to the same receiver. In a TDD system, transmit and receive timing gaps exist as guard bands to protect against transitions from transmit to receive and vice versa.

In the particular example 1 system depicted in FIG. 1, an "uplink" transceiver 108 includes a transmitter that shares an antenna with an uplink receiver. A duplex switch may alternatively couple the uplink transmitter or receiver to the uplink antenna in time duplex fashion. Similarly, a "downlink" transceiver 103 includes a receiver which shares a downlink antenna with a downlink transmitter. A downlink duplex switch may alternatively couple the downlink transmitter or receiver to the downlink antenna in time duplex fashion.

The mobile station transceiver 108 and the base station transceiver 103 are configured to communicate via a wireless data communication link 114. The mobile station transceiver 108 and the base station transceiver 102 cooperate with a suitably configured RF antenna arrangement 106/112 that can support a particular wireless communication protocol and modulation scheme. In the exemplary embodiment, the mobile station transceiver 108 and the base station transceiver 102 are configured to support industry standards such as the Third Generation Partnership Project Long Term Evolution (3GPP LTE), Third Generation Partnership Project 2 Ultra Mobile Broadband (3 Gpp2 UMB), Time Division-Synchronous Code Division Multiple Access (TD-SCDMA), and Wireless Interoperability for Microwave Access (WiMAX), and the like. The mobile station transceiver 108 and the base station transceiver 102 may be configured to support alternate, or additional, wireless data communication protocols, including future variations of IEEE 802.16, such as 802.16e, 802.16m, and so on.

According to certain embodiments, the base station 102 controls the radio resource allocations and assignments, and the mobile station 104 is configured to decode and interpret the allocation protocol. For example, such embodiments may be employed in systems where multiple mobile stations 104 share the same radio channel which is controlled by one base station 102. However, in alternative embodiments, the mobile station 104 controls allocation of radio resources for a particular link, and could implement the role of radio resource controller or allocator, as described herein.

Processor modules 116/122 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. Processor modules 116/122 comprise processing logic that is configured to carry out the functions, techniques, and processing tasks associated with the operation of system 100. In particular, the processing logic is configured to support the frame structure parameters described herein. In practical embodiments the processing logic may be resident in the base station and/or may be part of a network architecture that communicates with the base station transceiver 103.

The steps of a method or algorithm described in connection with the embodiments disclosed herein may be embodied directly in hardware, in firmware, in a software module executed by processor modules 116/122, or in any practical combination thereof. A software module may reside in memory modules 118/120, which may be realized as RAM memory, flash memory, ROM memory, EPROM memory, EEPROM memory, registers, a hard disk, a removable disk, a CD-ROM, or any other form of storage medium known in the art. In this regard, memory modules 118/120 may be coupled to the processor modules 118/122 respectively such that the processors modules 116/120 can read information from, and write information to, memory modules 118/120. As an example, processor module 116, and memory modules 118, processor module 122, and memory module 120 may reside in their respective ASICs. The memory modules 118/120 may also be integrated into the processor modules 116/120. In an embodiment, the memory module 118/220 may include a cache memory for storing temporary variables or other intermediate information during execution of instructions to be executed by processor modules 116/222. Memory modules 118/120 may also include non-volatile memory for storing instructions to be executed by the processor modules 116/120.

Memory modules 118/120 may include a frame structure database (not shown) in accordance with an exemplary embodiment of the invention. Frame structure parameter databases may be configured to store, maintain, and provide data as needed to support the functionality of system 100 in the manner described below. Moreover, a frame structure database may be a local database coupled to the processors 116/122, or may be a remote database, for example, a central network database, and the like. A frame structure database may be configured to maintain, without limitation, frame structure parameters as explained below. In this manner, a frame structure database may include a lookup table for purposes of storing frame structure parameters.

The network communication module 126 generally represents the hardware, software, firmware, processing logic, and/or other components of system 100 that enable bi-directional communication between base station transceiver 103, and network components to which the base station transceiver 103 is connected. For example, network communication module 126 may be configured to support internet or WiMAX traffic. In a typical deployment, without limitation, network communication module 126 provides an 802.3 Ethernet interface such that base station transceiver 103 can communicate with a conventional Ethernet based computer network. In this manner, the network communication module 126 may include a physical interface for connection to the computer network (e.g., Mobile Switching Center (MSC)).

On both downlink and uplink, the radio signal transmissions over the time are divided into periodic frames (or subframes, slots, etc). Each radio frame contains multiple time symbols that include data symbols (DS) and reference symbols (RS). Data symbols carry the data information, while the reference symbols are known at both transmitter and receiver, and are used for channel estimation purposes. Note that the functions described in the present disclosure may be performed by either a base station 102 or a mobile station 104. A mobile station 104 may be any user device such as a mobile phone, and a mobile station may also be referred to as user equipment (UE).

Embodiments disclosed herein have specific application but not limited to the Long Term Evolution (LTE) system that is one of the candidates for the 4-th generation wireless system. In LTE systems, for example, there may be two uplink controlling messages that are needed to transmit from the mobile station 104 to the base station 102. One of them is ACK/NACK signaling, which serves as the acknowledgement to the downlink HARQ transmission. One bit ACK/NACK corresponds to one downlink HARQ channel to indicate whether the latest packet on that downlink HARQ channel is successfully received or not. An ACK is sent upon successful reception of downlink HARQ packet, otherwise NACK is sent. There can be either one bit ($N_{ACK}=1$) or two bits ($N_{ACK}=2$) ACK/NACK per ACK/NACK message in LTE systems.

Figure 3:
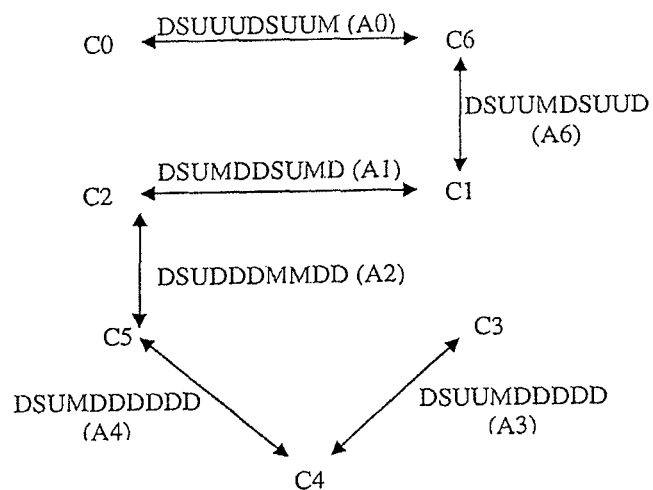
FIG. 3 shows a downlink-uplink allocation ratio change in an LTE TDD system, according to one embodiment.
Figure 4:
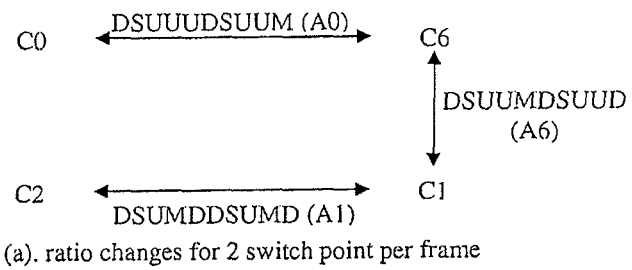
FIG. 4 shows a downlink-uplink allocation ratio change in an LTE TDD system, according to one embodiment.
Figure 4:
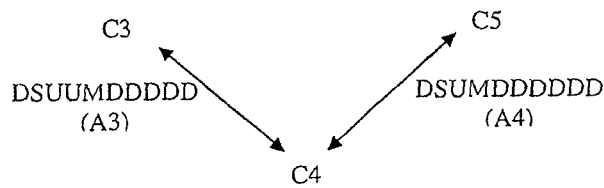

As discussed above, two TDD allocation ratio changes in an LTE system have been proposed, and are shown in FIG. 3 and FIG. 4, respectively. FIG. 3 allows any TDD allocation ratio changing to any one else possibly by first changing to one or even more other intermediate allocation ratios, while FIG. 4 only allows the allocation ratio changing to another with the same switching point periodicity. So FIG. 3 provides larger range for TDD allocation ratio to change. However, the LTE standard body confirms that any downlink portion of subframe including the DwPTS cannot be muted. Therefore a new allocation pattern should be defined to replace A2 in FIG. 3.

Figure 5:
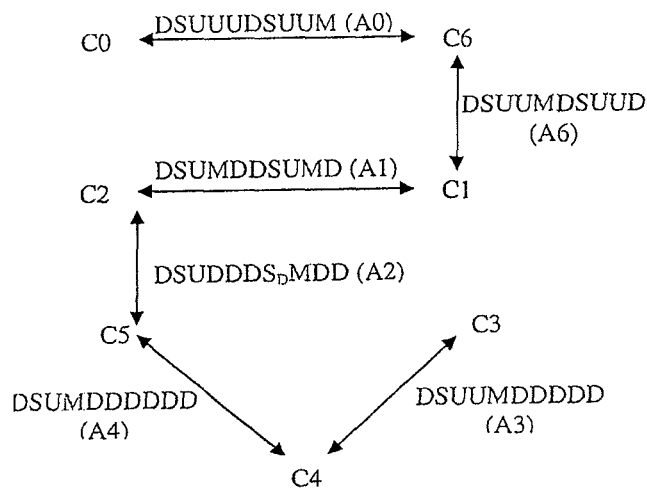
FIG. 5 shows a downlink-uplink allocation ratio change scenario in an LTE TDD system, according to one embodiment.

FIG. 5 shows a downlink-uplink allocation ratio change scenario in an LTE TDD system, according to one embodiment. Proposed TDD allocation ratio adjustment scenarios and the allocation patterns including the mute subframe (denoted as M) are given in FIG. 5, based upon the exemplary criteria that the number of mute subframes per radio frame for each ratio exchange is a minimum. It is noted that the new proposal in FIG. 5 differs from FIG. 3 and FIG. 4 by its allocation pattern A2, whose subframe allocation pattern is "DSUDDDS$_D$MDD", where S$_D$ represents the special subframe whose UpPTS portion is muted.

Table 4 provides exemplary downlink-uplink allocations with mute subframes to support live-change of (i.e., dynamic) allocation ratio, and shows the relationship between existing allocations and new allocations with mute subframes, where "Ui" refer to the uplink subframe whose subframe offset is i by counting the 1$^{st}$ subframe in the radio frame as subframe 0.

TABLE 4

TDD downlink-uplink allocations with mute subframes

| Downlink-uplink allocations | Subframe patterns | | | | | | | | | |
|---|---|---|---|---|---|---|---|---|---|---|
| | 0 | 1 | 2 | 3 | 4 | 5 | 6 | 7 | 8 | 9 |
| A0: mute U9 in C0 | D | S | U | U | U | D | S | U | U | M |
| A1: mute U3, U8 in C1 | D | S | U | M | D | D | S | U | M | D |
| A2: mute U7, 2nd UpPTS in C2 | D | S | U | D | D | D | S$_D$ | M | D | D |
| A3: mute U4 in C3 | D | S | U | U | M | D | D | D | D | D |
| A4: mute U3 in C4 | D | S | U | M | D | D | D | D | D | D |
| A6: mute U4 in C6 | D | S | U | U | M | D | S | U | U | D |

There may be two solutions, namely "simple turnoff" solution and "TDD configuration index substitution" solution, for example, to assist physical layer functions, such as downlink/uplink HARQ processes, random access preamble transmission and cell-specific SRS transmission, to work with mute subframe(s).

Simple Turnoff Solution

If a mobile terminal is informed by higher layer signaling of the existence of a mute subframe, the mobile terminal can simply turn off its transmission during muted subframes or muted UpPTS. Such behavior is predictable on the base station side, so the base station does not attempt to receive any uplink signals from the mobile terminal within muted subframes or muted UpPTS.

According to "Simple turnoff" in random access preamble transmission, for a given preamble format that needs N ($N\in\{1, 2, 3\}$) successive uplink subframes to fit in, it is assumed that its transmission is carried in subframes $\{t, t+1, \ldots, t+N-1\}$. If the transmission of this preamble encounters a muted uplink subframe, that mute subframe may be subframe t+N−1, because a muted uplink subframe is never followed by another uplink subframe. Therefore the mobile terminal can either not transmit this length-N preamble at all, or transmit a shorter preamble that fits into uplink subframes $\{t, t+1, \ldots, t+N-2\}$ if N>1. In either case, the mobile terminal's behavior may be specified by the standard and therefore known to base station.

According to "Simple turnoff" in cell-specific SRS transmission, if the multiple uplink subframes within which the mobile terminal is allowed to transmit SRS include mute subframes, the mobile terminal may avoid SRS transmission in those muted subframes but perform SRS transmission in other allowed uplink subframes.

According to "Simple turnoff" in downlink HARQ processes, the mobile terminal may not transmit ACK/NAK if that ACK/NAK falls into the muted uplink subframe. Both base station and mobile terminal could behave as if a positive ACK on this ACK/NAK signaling were sent, according to certain embodiments.

According to "Simple turnoff" in uplink HARQ processes, if the mobile terminal expects one HARQ initial transmission or retransmission would fall into a muted uplink subframe, it may simply not send that initial transmission or retransmission at all, and both base station and mobile terminal can behave as if that transmission was performed by mobile terminal but resulted in a reception failure at base station side, according to various embodiments.

TDD Configuration Index Substitution Solution

For any new allocation pattern $A_l$, there may be one normal TDD allocation $C_i$ such that $C_i=A_l(M=D)$, which means there may be a normal TDD allocation $C_i$ having the same set of "active" uplink subframes as $A_l$. Therefore, the base station and mobile terminal can borrow the corresponding timing relations from allocation $C_i$ to allocation $A_l$ for those physical layer functionalities whose performances heavily depend on the "active" uplink subframe. In other words, the mobile terminal should perform a TDD configuration index substitution l→i when applying the functional configuration for allocation $A_l$. The complete TDD configuration index substitution for all $A_l$ is given in Table 5 below. This concept of index substitution applies for downlink HARQ and l={0, 1, 3, 4, 6}. According to embodiments described herein, index substitution also works for random access preamble transmission and for case of l=2.

TABLE 5

TDD configuration index substitution

| | Index of TDD allocation w/ mute subframe (l) | | | | | |
|---|---|---|---|---|---|---|
| | 0 | 1 | 2 | 3 | 4 | 6 |
| Index of TDD allocation whose functional timing configuration is reused (i) | 6 | 2 | 5 | 4 | 5 | 1 |

A "simple turnoff" solution maintains single timing relationship, which is defined herein for TDD allocation $C_l$, in allocation $A_l$ for both existing mobile terminals and new-release mobile terminals. However, turning off ACK/NAK signaling for downlink HARQ process may cause serious performance degradation. On the other hand, the "TDD configuration index substitution" solution achieves a maximum number of normal downlink HARQ processes, but includes the co-existence of two different ACK/NAK timings: one for existing mobile terminals and another for new-release mobile terminals. In practice, these two solutions can be used on different functions, for example, "TDD configuration index substitution" solution can be used in downlink HARQ process to guarantee traffic performance, while "simple turnoff" solution can be used for other functions such as random access preamble transmission, cell-specific SRS transmission and uplink HARQ transmission. Of course, this is merely an exemplary combination of solutions, and various other combinations would be apparent to one of ordinary skill in the art.

In implementation, according to certain embodiments, the above described mechanisms and their variations may be implemented as computer software instructions or firmware instructions. Such instructions may be stored in an article with one or more machine-readable storage devices connected to one or more computers or digital processors such as digital signal processors and microprocessors, as described above with respect to FIG. 1. In a communication system, the TDD allocation ratio adjustment and its process may be implemented in form of software instructions or firmware instructions for execution by a processor in the transmitter or its transmission controller. In operation, the instructions are executed by one or more processors to cause the transmitter or its transmission controller and receiver or receiver controller to perform the described functions and operations.

Figure 6:
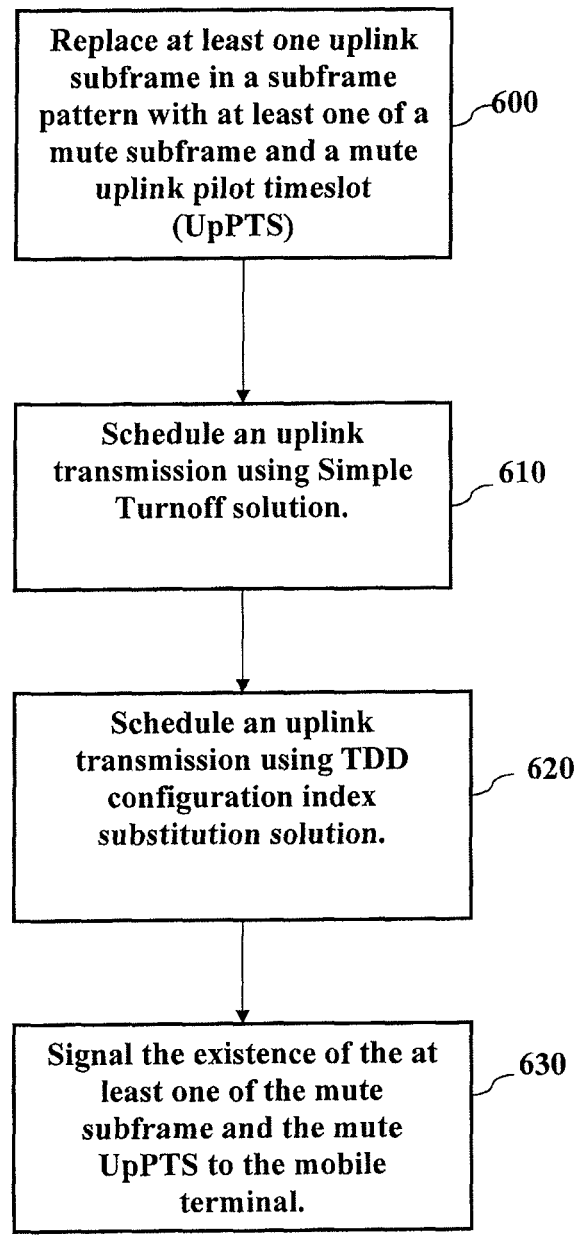
FIG. 6 is a flow diagram illustrating a method for dynamic adjustment of downlink/uplink resource allocation ratio in an LTE TDD system, according to one embodiment.

FIG. 6 is a flow diagram illustrating a method for dynamic adjustment of downlink/uplink resource allocation ratio in an LTE TDD system, according to one embodiment. Referring to FIG. 6, as operation 600, a processor module 116 or 122, for example, replaces at least one uplink subframe in a subframe pattern with at least one of a mute subframe and a mute UpPTS, within a geographical guard area that isolates at least two areas having different TDD allocation patterns.

Referring back to FIG. 5, allocation pattern A2, whose subframe allocation pattern is "DSUDDDS$_D$MDD", where S$_D$ represents the special subframe whose UpPTS portion is muted. Table 4 (e.g., a lookup table) may be stored in memory module 118 and/or 120, and accessible by processor modules 116 and/or 122. Table 4 provides exemplary downlink-uplink allocations with mute subframes to support live-change of (i.e., dynamic) allocation ratio, and shows the relationship between existing allocations and new allocations with mute subframes, where "Ui" refer to the uplink subframe whose subframe offset is i by counting the 1$^{st}$ subframe in the radio frame as subframe 0.

From operation 600, the process continues to operations 610-620, where a scheduler as part of processor module 116 and/or 122 schedules an uplink transmission from at least one mobile terminal such that the at least one of the mute subframe and the mute UpPTS are unused.

An uplink transmission may be scheduled using a Simple Turnoff solution (operation 610) and/or a TDD configuration index substitution solution (operation 620). The two solutions may be used exclusively or in any combination and in any order during transmissions. According to a Simple Turnoff solution 610, if a mobile terminal 104 is informed by higher layer signaling of the existence of a mute subframe, the mobile terminal 104 can simply turn off its transmission during muted subframes or muted UpPTS. Such behavior is predictable on the base station side, so the base station 102 does not attempt to receive any uplink signals from the mobile terminal 104 within muted subframes or muted UpPTS.

According to a TDD configuration index substitution solution, the mobile terminal 104, for example, can perform a TDD configuration index substitution l→i when applying the functional configuration for allocation $A_l$. The complete TDD configuration index substitution for all $A_l$ is given in a lookup table (e.g., Table 5) which may be stored in memory modules 118 and/or 120 and accessible by processor modules 116 and/or 122.

The process further may include an operation 630 of signaling (or otherwise indicating) the existence of the at least one of the mute subframe M and the mute UpPTS to the mobile terminal 104. As a result, in a Simple Turnoff solution, for example, the mobile terminal 104 can either not transmit this length-N preamble at all, or transmit a shorter preamble that fits into uplink subframes {t, t+1, . . . , t+N−2} if N>1, for example.

As discussed herein these two solutions can be used on different functions, for example, TDD configuration index substitution solution can be used in downlink HARQ process to guarantee traffic performance, while Simple Turnoff solution can be used for other functions such as random access preamble transmission, cell-specific SRS transmission and uplink HARQ transmission. Of course, this is merely an exemplary combination of solutions, and various other combinations would be apparent to one of ordinary skill in the art.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for dynamic adjustment of downlink/uplink resource allocation ratio in a long-term evolution (LTE) time division duplex (TDD) system, comprising:
    replacing at least one uplink subframe in a subframe pattern with at least one of a mute subframe and a mute uplink pilot timeslot (UpPTS), within a geographical guard area that isolates at least two areas having different TDD allocation patterns; and
    scheduling an uplink transmission from at least one mobile terminal such that the at least one of the mute subframe and the mute UpPTS are unused,
    further comprising: performing a TDD configuration index substitution l→i when applying the functional configuration from TDD allocation $C_i$ to TDD allocation $A_l$ containing a mute subframe, wherein the substitution mapping l→i is determined by $C_i=A_l$ (M=D) and is determined by a lookup table.

2. The method of claim 1, wherein a simple turnoff solution controls an uplink transmission where the subframe pattern includes at least one of the mute subframe and the mute UpPTS.

3. The method of claim 2, further comprising: signaling the existence of the at least one of the mute subframe and the mute UpPTS to the at least one mobile terminal, such that the at least one mobile terminal avoids the uplink transmission during the at least one of the mute subframe and the mute UpPTS.

4. The method of claim 3, further comprising: if the mobile terminal needs to transmit a random access preamble occupying N subframes and fitting in subframes {t, t+1, t+N−1} and at least one of the N subframes are muted, cancelling the entire preamble transmission or transmitting a shorter preamble within subframes {t, t+1, t+N−2}.

5. The method of claim 4, further comprising: informing a base station of the cancelling the entire preamble transmission or transmitting a shorter preamble within subframes {t, t+1, t+N−2}.

6. The method of claim 3, further comprising: if multiple uplink subframes within which the mobile terminal is allowed to transmit a cell-specific sounding reference signal (SRS) include mute subframes, avoiding SRS transmission in the muted subframes, and performing normal SRS transmission in one or more of the other multiple uplink subframes.

7. The method of claim 3, wherein uplink transmission is unscheduled in a subframe that has an acknowledgement/negative acknowledgment (ACK/NAK) signal in a mute uplink subframe, and the mobile station and a base station behave as if a positive ACK were transmitted.

8. The method of claim 3, wherein the mobile terminal does not send one uplink HARQ initial transmission or retransmission if that initial transmission or retransmission falls into a muted uplink subframe, and a base station and the mobile terminal behave as if that transmission was sent by the mobile terminal but resulted in a reception failure at base station side.

9. The method of claim 1, wherein a TDD configuration index substitution solution controls an uplink transmission where the subframe pattern includes at least one of the mute subframe and the mute UpPTS.

10. The method of claim 1, wherein the TDD configuration index substitution solution is used to determine ACK/NAK timing within a downlink HARQ transmission.

11. The method of claim 1, wherein the TDD configuration index substitution solution is used to determine random access preamble transmission resources in a time domain.

12. A station configured for dynamic adjustment of downlink/uplink resource allocation ratio in a long-term evolution (LTE) time division duplex (TDD) system, comprising:
   a processor configured to replace at least one uplink subframe in a subframe pattern with at least one of a mute subframe and a mute uplink pilot timeslot (UpPTS), within a geographical guard area that isolates at least two areas having different TDD allocation patterns; and
   a scheduler configured to schedule an uplink transmission from at least one mobile terminal such that the at least one of the mute subframe and the mute UpPTS are unused, further comprising: a processor configured to perform a TDD configuration index substitution $1 \rightarrow i$ when applying the functional configuration from TDD allocation $C_i$ to TDD allocation $A_I$ containing a mute subframe wherein the substitution mapping $1 \rightarrow i$ is determined $C_i = A_I(M=D)$ and is determined by a lookup table.

13. The station of claim 12, wherein a simple turnoff solution controls an uplink transmission where the subframe pattern includes at least one of the mute subframe and the mute UpPTS.

14. The station of claim 13, further comprising: a transceiver configured to inform the existence of the at least one of the mute subframe and the mute UpPTS to the at least one mobile terminal, such that the at least one mobile terminal avoids the uplink transmission during the at least one of the mute subframe and the mute UpPTS.

15. The station of claim 14, further comprising: if the mobile terminal needs to transmit a random access preamble occupying N subframes and fitting in subframes $\{t, t+1, \ldots, t+N-1\}$ and at least one of the N subframes are muted, a processor configured to cancel the entire preamble transmission or transmitting a shorter preamble within subframes $\{t, t+1, \ldots, t+N-2\}$.

16. The station of claim 15, further comprising: a transceiver configured to inform a base station of the cancelling the entire preamble transmission or transmitting a shorter preamble within subframes $\{t, t+1, \ldots, t+N-2\}$.

17. The station of claim 15, wherein uplink transmission is unscheduled in a subframe that has an acknowledgement/negative acknowledgment (ACK/NAK) signal in a mute uplink subframe, and the mobile station and a base station behave as if a positive ACK were transmitted.

18. The station of claim 14, further comprising: if multiple uplink subframes within which the mobile terminal is allowed to transmit a cell-specific sounding reference signal (SRS) include mute subframes, avoiding SRS transmission in the muted subframes, and a transceiver configured to perform normal SRS transmission in one or more of the other multiple uplink subframes.

19. The station of claim 14, wherein the mobile terminal does not send one uplink HARQ initial transmission or retransmission if that initial transmission or retransmission falls into a muted uplink subframe, and a base station and the mobile terminal behave as if that transmission was sent by the mobile terminal but resulted in a reception failure at base station side.

20. The station of claim 12, wherein a TDD configuration index substitution solution controls an uplink transmission where the subframe pattern includes at least one of the mute subframe and the mute UpPTS.

21. The station of claim 12, wherein the TDD configuration index substitution solution is used to determine ACK/NAK timing within a downlink HARQ transmission.

22. The station of claim 12, wherein the TDD configuration index substitution solution is used to determine random access preamble transmission resources in a time domain.

23. The station of claim 12, wherein the station is a base station.

24. A non-transitory computer-readable medium storing instructions thereon that when executed by a processor perform a method for dynamic adjustment of downlink/uplink resource allocation ratio in a long-term evolution (LTE) time division duplex (TDD) system, the method comprising:
   replacing at least one uplink subframe in a subframe pattern with at least one of a mute subframe and a mute uplink pilot timeslot (UpPTS), within a geographical guard area that isolates at least two areas having different TDD allocation patterns; and
   scheduling an uplink transmission from at least one mobile terminal such that the at least one of the mute subframe and the mute UpPTS are unused, the method further comprising: performing a TDD configuration index substitution $1 \rightarrow i$ when applying the functional configuration from TDD allocation $C_i$ TDD allocation $A_I$ containing a mute subframe wherein the substitution mapping $1 \rightarrow i$ is determined b $C_i = A_I(M=D)$ and is determined by a lookup table.

25. The non-transitory computer-readable medium of claim 24, wherein a simple turnoff solution controls an uplink transmission where the subframe pattern includes at least one of the mute subframe and the mute UpPTS.

26. The non-transitory computer-readable medium of claim 25, the method further comprising: informing the existence of the at least one of the mute subframe and the mute UpPTS to the at least one mobile terminal, such that the at least one mobile terminal avoids the uplink transmission during the at least one of the mute subframe and the mute UpPTS.

27. The non-transitory computer-readable medium of claim 26, the method further comprising: if the mobile terminal needs to transmit a random access preamble occupying N subframes and fitting in subframes $\{t, t+1, \ldots, t+N-1\}$ and at least one of the N subframes are muted, cancelling the entire preamble transmission or transmitting a shorter preamble within subframes $\{t, t+1, \ldots, t+N-2\}$.

28. The non-transitory computer-readable medium of claim 27, the method further comprising: informing a base station of the cancelling the entire preamble transmission or transmitting a shorter preamble within subframes $\{t, t+1, \ldots, t+N-2\}$.

29. The non-transitory computer-readable medium of claim 26, the method further comprising: if multiple uplink subframes within which the mobile terminal is allowed to transmit a cell-specific sounding reference signal (SRS) include mute subframes, avoiding SRS transmission in the muted subframes, and performing normal SRS transmission in one or more of the other multiple uplink subframes.

30. The non-transitory computer-readable medium of claim 26, wherein uplink transmission is unscheduled in a subframe that has an acknowledgement/negative acknowledgment (ACK/NAK) signal in a mute uplink subframe, and the mobile station and a base station behave as if a positive ACK were transmitted.

31. The non-transitory computer-readable medium of claim 26, wherein the mobile terminal does not send one uplink HARQ initial transmission or retransmission if that initial transmission or retransmission falls into a muted uplink subframe, and a base station and the mobile terminal behave as if that transmission was sent by the mobile terminal but resulted in a reception failure at base station side.

32. The non-transitory computer-readable medium of claim 24, wherein a TDD configuration index substitution solution controls an uplink transmission where the subframe pattern includes at least one of the mute subframe and the mute UpPTS.

33. The non-transitory computer-readable medium of claim 24, wherein the TDD configuration index substitution solution is used to determine ACK/NAK timing within a downlink HARQ transmission.

34. The non-transitory computer-readable medium of claim 24, wherein the TDD configuration index substitution solution is used to determine random access preamble transmission resources in a time domain.

* * * * *